United States Patent
Abresch et al.

(10) Patent No.: US 11,273,502 B2
(45) Date of Patent: Mar. 15, 2022

(54) APPARATUS FOR METAL-CUTTING MACHINING OF WEAR-AFFECTED BIT HOLDERS OF ROAD MILLING MACHINES, AND USE OF AN APPARATUS FOR OVERHAULING SUCH WEAR-AFFECTED BIT HOLDERS

(71) Applicant: Wirtgen GmbH, Windhagen (DE)

(72) Inventors: Stefan Abresch, Dierdorf (DE); Thomas Lehnert, Oberraden (DE); Markus Reindorf, Aachen (DE); Cyrus Barimani, Königswinter (DE)

(73) Assignee: Wirtgen GmbH

( * ) Notice: Subject to any disclaimer, the term of this patent is extended or adjusted under 35 U.S.C. 154(b) by 299 days.

(21) Appl. No.: 15/826,794

(22) Filed: Nov. 30, 2017

(65) Prior Publication Data
US 2018/0161888 A1    Jun. 14, 2018

(30) Foreign Application Priority Data

Dec. 9, 2016  (DE) ..................... 10 2016 224 606.2

(51) Int. Cl.
*B23C 3/36*     (2006.01)
*B24B 23/08*   (2006.01)
(Continued)

(52) U.S. Cl.
CPC ............... *B23C 3/36* (2013.01); *B23C 3/007* (2013.01); *B23Q 9/0057* (2013.01);
(Continued)

(58) Field of Classification Search
CPC . Y10T 409/304144; Y10T 409/306384; Y10T 409/30644; B24B 7/16;
(Continued)

(56) References Cited

U.S. PATENT DOCUMENTS 2,188,720 A * 1/1940 McQuade ............... B24B 23/08
                                                                     451/441
2,414,731 A * 1/1947 Forbes, Jr. .............. B24B 23/08
                                                                     451/439
(Continued)

FOREIGN PATENT DOCUMENTS

CN        101092877 A     12/2007
CN        104655507 A      5/2015
(Continued)

OTHER PUBLICATIONS

EPO Machine Translation of DE102013112973A1—Paulsen, Sven; "Method for wear prognosis for soil cultivating machine e.g. road milling machine"; May 28, 2015.*
(Continued)

*Primary Examiner* — Erica E Cadugan
*Assistant Examiner* — Michael Vitale
(74) *Attorney, Agent, or Firm* — Lucian Wayne Beavers; Patterson Intellectual Property Law, PC (57) ABSTRACT

An apparatus for metal-cutting machining of wear-affected bit-head-proximal end regions of bit holders of road milling machines encompasses:
  a rotary actuator having an output member rotating around an actuator rotation axis;
  at least one material-removing tool, rotatable around a tool rotation axis, which is coupled or couplable to the output member so as to rotate together;
  a positioning arbor, extending along an arbor axis, which is embodied for introduction into a bit receptacle opening of a bit holder and which comprises an abutment segment, located radially remotely from the arbor axis and facing away from the arbor axis in a direction having a radial component, which is embodied for abutment against an inner wall of the bit receptacle opening.

(Continued)

A material-removing region, populated with cutting edges, of the material-removing tool is arranged between the positioning arbor and the output member.

19 Claims, 5 Drawing Sheets

(51) Int. Cl.
| | | |
|---|---|---|
| *B24B 7/16* | (2006.01) | |
| *B23Q 9/00* | (2006.01) | |
| *B23C 3/00* | (2006.01) | |
| *B24B 27/00* | (2006.01) | |

(52) U.S. Cl.
CPC .............. *B23Q 9/0071* (2013.01); *B24B 7/16* (2013.01); *B24B 23/08* (2013.01); *B24B 27/0076* (2013.01)

(58) Field of Classification Search
CPC ......... B24B 23/08; B23C 3/007; B23C 3/126; B23C 3/36; B23Q 9/0021; B23Q 9/0035; B23Q 9/0057
USPC .............................. 409/138, 178, 179; 451/48
See application file for complete search history.

(56) References Cited

U.S. PATENT DOCUMENTS

| | | | | |
|---|---|---|---|---|
| 2,869,293 | A | | 1/1959 | Howard |
| 3,134,202 | A | | 5/1964 | Hoefler |
| 3,142,139 | A | | 7/1964 | Mangum |
| 3,386,337 | A | * | 6/1968 | Spier .................... B23Q 9/0021 |
| | | | | 409/179 |
| 3,893,263 | A | * | 7/1975 | Jackman ................. B24B 23/08 |
| | | | | 451/246 |
| 4,513,542 | A | * | 4/1985 | Wilger .................... B24B 23/08 |
| | | | | 451/281 |
| 4,934,109 | A | | 6/1990 | Allred |
| 6,007,410 | A | * | 12/1999 | Nerenberg ................ B24B 5/40 |
| | | | | 29/282 |
| 6,743,079 | B2 | * | 6/2004 | Bown ....................... B24B 5/04 |
| | | | | 451/51 |
| 7,082,656 | B1 | | 8/2006 | Duncan et al. |
| 7,103,950 | B1 | | 9/2006 | Scheffer |
| 7,490,912 | B2 | | 2/2009 | Holl |
| 10,416,056 | B2 | | 9/2019 | Paulsen et al. |
| 2006/0119165 | A1 | | 6/2006 | Holl et al. |
| 2010/0181820 | A1 | | 7/2010 | Latham |
| 2012/0073132 | A1 | | 3/2012 | Sugitani et al. |
| 2018/0161888 | A1 | | 6/2018 | Abresch et al. |

FOREIGN PATENT DOCUMENTS

| | | | | |
|---|---|---|---|---|
| CN | 208132572 | U | | 11/2018 |
| DE | 2143055 | A1 | | 3/1973 |
| DE | 10330854 | A1 | | 1/2005 |
| DE | 102013112973 | A1 | | 5/2015 |
| EP | 2639402 | A2 | * | 9/2013 ........... E21C 35/197 |

OTHER PUBLICATIONS

EPO Machine Translation of DE10330854A1—Rodler, Dietler; "Grinding device for rounding off edges, has setting part, turning link, spring, grindstone, drive for grindstone, tool, tool carrier, and tool carrier turning arm"; Jan. 27, 2005.*
China Office Action for corresponding patent application No. 201711234227.2, dated Oct. 8, 2019, 6 pages (not prior art).
European Search Report for corresponding European application No. EP 17 20 5743, dated Mar. 13, 2018, 12 pages (not prior art).
Office action of Aug. 10, 2017 in corresponding German patent application No. 10 2016 224 606.2 (6 pages)(not prior art).

* cited by examiner

APPARATUS FOR METAL-CUTTING MACHINING OF WEAR-AFFECTED BIT HOLDERS OF ROAD MILLING MACHINES, AND USE OF AN APPARATUS FOR OVERHAULING SUCH WEAR-AFFECTED BIT HOLDERS

1. FIELD OF THE INVENTION

The present invention relates to a method for overhauling a milling drum of a road milling machine having a plurality of bit holders that are each embodied to receive a milling bit shank, extending along a shank axis, of a milling bit that comprises the milling bit shank and a bit head, having a bit tip, attached thereto, in a bit receptacle opening extending along a receptacle axis, at least part of the bit holder respectively comprising a worn bit-head-proximal end region that surrounds a bit-head-proximal end segment of the bit receptacle opening and comprises an end surface facing toward the bit head during milling operation, the method encompassing the following steps:

identifying a bit-holder-related wear state of the milling drum, and furnishing the milling drum with bit holders whose respective end surface facing toward the bit head during milling operation is displaced, compared with the unworn state of the bit holder at the same respective bit holder position before the beginning of wear-causing milling operation, along the receptacle axis as a function of the identified wear state.

The present invention furthermore relates to an apparatus for metal-cutting machining of wear-affected bit-head-proximal end regions of bit holders of road milling machines, in particular in the course of overhauling the milling drum in accordance with the overhauling method described in the present application.

2. DESCRIPTION OF THE PRIOR ART

Road milling machines use a milling drum, provided on the road milling machine rotatably around a milling drum axis, for material-removing processing of roadway pavements. On its enveloping side of the milling drum surrounding the milling drum at a radial distance from the milling drum axis, and occasionally on the end faces terminating the enveloping side at its longitudinal ends, the milling drum is populated with bit holders in which milling bits are replaceably retained. The replacement of milling bits, which experience large mechanical loads during operation of the milling drum, is thereby facilitated.

A milling bit usually comprises a bit shank that serves to retain it in a bit holder, and comprises a bit head having a bit tip that, during operation, brings about material removal from the roadway that is to be processed.

Bit holders of road milling machines as a rule encompass a sleeve-shaped segment that completely surrounds the bit shank around its shank axis during operation of the milling drum or on the milling drum prepared for operation. The bit holder can itself be directly attached to the milling drum body, for example by welding. In order also to facilitate replacement of the bit holder, the latter can be embodied as a so-called "quick-change" bit holder, and can be part of a quick-change tool holder system. A quick-change tool holder system of this kind encompasses a support member (base part) attached fixedly and permanently, for example by welding, to the milling drum body, and the quick-change bit holder that is attached detachably to the support member and completely surrounds the bit shank on the milling drum prepared for operation. The quick-change bit holder is thus retained directly on the support member and indirectly on the milling drum base member. The term "bit holder" in this application encompasses any type of attachment component that attaches a milling bit to the milling drum base member, including and in particular a quick-change bit holder.

The bit shank of a milling bit extends as a rule along a straight shank axis, which as a rule is also the bit axis. The milling bits are received in the bit holders rotatably around their shank axis so as to permit a rotation of the milling bits, during milling operation, around their shank axis and thereby to counteract one-sided wear of the bit tip. In order to protect the bit head from wear in its region distal from the bit tip and proximal to the bit holder, a wear disk is provided as a sacrificial component between the bit-head-proximal end region of a bit holder and the bit head of a milling bit retained by the bit holder.

During milling operation, fine-grained material removed from the roadway pavement unavoidably penetrates between the bit head or wear disk on the one hand and the end surface of the bit-head-proximal end region of the bit holder on the other hand. Because the material removed from roadway pavements contains mineral and/or ceramic constituents, which not only are very hard but also have sharp broken edges, the fine-grained removed material penetrating between the bit head/wear disk and the bit-head-proximal end region has a very abrasive effect therein. The abrasive effect of the fine-grained removed material between the bit head/wear disk and bit holder becomes further intensified by the deliberate relative rotation of the bit around its shank axis relative to the bit holder during milling operation, and results in considerable wear, inter alia, on the bit-head-proximal end region of the bit holder despite the hardened surfaces of the bit holder.

As a result of this wear, the (as a rule, sleeve-shaped) bit-head-proximal segments of the bit holders are worn down along the receptacle axis of their bit receptacle opening from the bit introduction orifice through which the bit shank is inserted into the bit receptacle opening. The end surface facing toward the bit head during milling operation is therefore displaced in response to wear. This material wear occurs, in the best case, in a plane approximately orthogonal to the receptacle axis, which preferably coincides with the shank axis of the milling bit when a milling bit is received in the bit receptacle opening. In less favorable situations the wear occurs irregularly in a circumferential direction around the receptacle axis, so that that end surface of the bit holder which faces toward the bit head can enclose with the receptacle axis an angle differing from a right angle, and/or can be curved around one or more curvature axes orthogonal to the receptacle axis.

As a result of the above-described wear on the bit-head-proximal end regions of the bit holder at their end surface against which the bit head abuts usually with interposition of the wear disk, the location of the material of the bit tip which removes the road pavement changes, thus changing the overall processing characteristics of the milling drum during milling operation.

It is of course possible in principle to replace worn bit holders, or worn components thereof, with new ones. This is complex, however, and therefore expensive.

It is known in the existing art to keep in stock bit holders of the same type having different lengths along the receptacle axis. Depending on the wear state of the bit-head-proximal end regions of the bit holders of a milling drum it is then possible to leave those bit holders having the most severely worn end regions on the milling drum, while less severely worn bit holders are replaced with new, but shorter, bit holders, so that after the overhaul those end surfaces of bit holders which face toward the bit head during milling operation are displaced, as compared with the original state of the bit holders before the beginning of wear-causing milling operation, by approximately the same displacement amount along the receptacle axis. The milling bits are thereby once again located on uniform cutting circles that, however, are smaller as compared with the original state of the bit holders before the beginning of wear-causing milling operation. All in all, fewer bit holders need to be replaced as compared with complete replacement.

The difference between the cutting circle diameters can be adjusted by modifying the milling depth, so that a milling result of the same high quality is achievable with the overhauled milling drum, bearing in mind its modified relevant cutting dimensions, as with an unworn milling drum.

It is disadvantageous, however, that because the bit holders are kept in stock only in predetermined different discrete lengths, the milling drum can only usefully be overhauled when a specific degree of wear has been reached. If the optimum degree of wear for an overhaul has passed, any overhaul that is carried out is only suboptimal, since the available replacement bit holders are then not physically an optimum match for the degree of wear.

SUMMARY OF THE INVENTION

The object of the invention is therefore to furnish a technical teaching that enables technically more advantageous overhauling of road milling machine milling drums having bit holders having worn bit-head-proximal end regions than the existing art.

According to a first aspect of the present invention this object is achieved by a method of the kind recited initially in which the furnishing of the milling drum with bit holders having end surfaces displaced along the receptacle axis encompasses metal-cutting machining at the bit-head-proximal end regions of the bit holders having end surfaces displaced along the receptacle axis.

Thanks to the metal-cutting machining at the bit-head-proximal end regions, the latter can be machined steplessly. The end surfaces of the bit-head-proximal end regions can thus be displaced steplessly along the receptacle axis, so that optimum overhauling of a milling drum having worn bit holders is possible at any time.

In addition, there is no need for painstaking measurement of the bit holders of a milling drum, or even quantification of the wear, in order to identify the wear state as it relates to the bit holders. That purpose is served by simply providing information regarding the wear state of the bit holders of a milling drum which is sufficient that the extent of the metal-cutting machining required for overhauling can be deduced therefrom. It can be sufficient in this context to determine the respective bit holder, or group of bit holders, having the bit-head-proximal end regions that are most severely worn, so as to identify from its or their quantity of wear the point to which the end surfaces of bit holders of the milling drum must be displaced so that bit holders that were located on a uniform cutting circle before the beginning of wear-causing milling operation are once again located substantially on a uniform cutting circle that, however, will have a smaller diameter as compared with the original cutting circle. If a milling drum comprises in the original state, before the beginning of wear-causing milling operation, bit holders that are located on different cutting circles, the radial spacings of the different cutting circles of the overhauled milling drum from one another should then be of the same magnitude as those of the original unworn milling drum, so that the milling pattern on the roadway pavement processed with the overhauled milling drum is the same as with the original unworn milling drum. It can be sufficient, for example, if a wear state is determined, e.g. on the basis of predetermined wear marks or on the basis of gauges, in the context of the accuracy necessary for milling processing of roadway surfaces.

An identification of the wear state and a displacement of the bit-head-proximal end surfaces of further bit holders as a function of the identified wear state furthermore also exists for purposes of the present invention, for example, if firstly, based on a cursory inspection of the used milling drum, a prominently worn bit holder is identified and overhauled, and if further bit holders whose end surfaces are intended to have a predetermined spatial relationship to that of the overhauled bit holder are machined in metal-cutting fashion based on the apparatus settings ascertained upon overhaul of the first bit holder, thereby displacing their bit-head-proximal end surfaces.

Very generally, the metal-cutting machining can be accomplished in any fashion. Rotationally symmetrical bit holders can be machined in metal-cutting fashion, for example, by being turned down, with the result that their end surfaces are displaced along the receptacle axis. Not all bit holders are rotationally symmetrical, however, and thereby suitable for machining by turning. In addition, for machining by turning, bit holders must be detached from the milling drum and secured to it again after machining, which considerably increases the outlay in terms of work and time for overhauling. It is therefore preferred that metal-cutting machining of that end surface of the bit-head-proximal end region which faces toward the bit head during milling operation be accomplished along the receptacle axis. This is because the bit holder is accessible along the receptacle axis even in the state mounted on the milling drum, so that metal-cutting machining of the bit-head-proximal end region of a bit holder can be accomplished along the receptacle axis without detaching the bit holder from a milling drum base element. Metal-cutting machining of bit holders can then be accomplished in a time- and cost-saving manner, while they are attached to a milling drum base element of the milling drum. In addition, the receptacle opening, also accessible along the receptacle axis, can advantageously be used as a tool guide for advancing the metal-cutting machining tool along the receptacle axis.

Because the purpose of overhauling the milling drum is substantially to re-equalize the length differences in the bit holders which were generated by wear, once at least the bit holder or group of bit holders having maximally worn bit-head-proximal end regions is or are identified in the course of identification of the bit-holder-related wear state it is possible, by metal-cutting machining of the bit-head-proximal end region of a bit holder, to displace its end surface with reference to its location in the original unworn state by at least the amount along the receptacle axis by which the end surface of the bit holder having the maximally worn bit-head-proximal end region was displaced, by wear, along the receptacle axis with reference to its location in the original unworn state. A milling drum that once again has physically uniform bit holders, and thus has cutting circles which are uniform but are decreased as compared with the unworn state, can thereby be obtained in simple fashion.

Because a milling drum comprises, depending on its intended purpose, a different number of, but always many, bit holders that are of the same type or are at least physically similar, rapid processing of worn bit holders is of considerable economic advantage.

In accordance with a further aspect, the object recited previously is achieved by an apparatus for metal-cutting machining of wear-affected bit-head-proximal end regions of bit holders of road milling machines, the apparatus encompassing:
- a rotary actuator having an output member rotating around an actuator rotation axis;
- at least one material-removing tool, rotatable around a tool rotation axis, which is coupled or couplable to the output member so as to rotate together;
- a positioning arbor, extending along an arbor axis, which is embodied for introduction into a bit receptacle opening of a bit holder and which comprises an abutment segment, located radially remotely from the arbor axis and facing away from the arbor axis in a direction having a radial component, which is embodied for abutment against an inner wall of the bit receptacle opening, a material-removing region, populated with cutting edges, of the material-removing tool being arranged between the positioning arbor and the output member.

Thanks to the above-described positioning arbor, the (always present) bit receptacle opening of the bit holders can be used to position the material-removing tool sufficiently accurately in terms of location and orientation relative to the quick-change bit holder. The material-removing tool is therefore located, according to the present invention, between the positioning arbor that positions the apparatus having the material-removing tool and the rotary actuator that actuates the material-removing tool to perform a material-removing motion. The above-described output member can be a clamping chuck onto which a material-removing tool can be clamped. It can also, however, be an output shaft from which torque of the rotary actuator can be picked off and transferred to the material-removing tool.

The positioning arbor utilizes, with the abutment segment, the inner wall of the bit receptacle opening, which is little affected by wear. In addition to the low wear impact on the inner wall and the associated geometric consistency of the inner wall even over long operating times, the inner wall of the bit receptacle opening has the further advantage that it is in general embodied in cylindrical fashion and thus represents a simple control geometry usable for exact positioning of the material-removing tool.

In principle, it can be sufficient for exact positioning of the material-removing tool relative to the bit holder if the positioning arbor is embodied for abutment against the inner wall of the bit receptacle opening only along a narrow abutment region parallel to the arbor axis. The positioning arbor then as a rule has a smaller diameter than the bit receptacle opening.

It can also be advantageous, however, to use the positioning arbor for centering relative to the bit receptacle opening, so that the arbor axis of the positioning arbor, correctly introduced into the bit receptacle opening, is collinear with the receptacle axis of the bit receptacle opening. For this latter case it is advantageous if the abutment segment embodied for abutment against the inner wall of the bit receptacle opening comprises a plurality of abutment sub-segments arranged with a spacing from one another in a circumferential direction around the arbor axis. For example, the positioning arbor could comprise three or more equidistant abutment sub-segments arranged in a circumferential direction around the arbor axis with a spacing from one another. Each abutment sub-segment can be constituted by a spring-preloaded component, so that upon introduction of the positioning arbor into the bit receptacle opening, said component is deflected radially toward the arbor axis against the preload effect of its preloading spring.

For maximally accurate positioning of the positioning arbor relative to the bit holder, simultaneously with a low surface pressure between the abutment segment or abutment sub-segments and the inner wall of the bit receptacle opening, it is advantageous if the abutment segment extends, in particular extends in completely continuous fashion, in a circumferential direction around the arbor axis. The abutment segment can be constituted, for example, by one or more circumferential rings.

In order to avoid an angular offset between the arbor axis and receptacle axis of the bit receptacle opening when the positioning arbor is correctly centered, it is furthermore advantageous if the abutment segment has, in an axial direction along the arbor axis, two abutment sub-segments that are respectively embodied, with an axial spacing from one another, for abutment against the inner wall of the bit receptacle opening.

Exact centering of the positioning arbor simultaneously with a maximally collinear arrangement of the arbor axis and receptacle axis can be achieved by the fact that the abutment segment of the positioning arbor is embodied on a conical or cylindrical outer surface of the positioning arbor, so that the abutment segment comprises an abutment surface that not only preferably proceeds in completely continuous fashion around the arbor axis but also extends axially along the arbor axis over a distance that preferably is longer than the diameter, preferably is equal to at least twice the diameter, of the abutment surface.

Because the conformation of the bit holders or bit holder segments retaining the bit shank is often sleeve-shaped, it is tempting to simultaneously machine the bit-head-proximal end region of a bit holder in metal-cutting fashion along its entire periphery around the receptacle axis. This is disadvantageous, however, since the bit holder as a rule is manufactured from hardened steel, and machining it with an uninterrupted cutting engagement results in heating of the machining site, which can destroy the material-removing tool before the machining result is achieved. It is preferable to envision a metal-cutting machining operation in which no coolant or coolant/lubricant is delivered to the machining site, since it should preferably be possible for metal-cutting machining for the purpose of overhauling worn bit-head-proximal end regions of bit holders also to occur in mobile fashion on construction sites at which the respective bit holders are currently in use on milling drums. Particularly preferably, overhauling should be accomplished while the milling drum that requires overhauling is mounted on a road milling machine.

The material-removing tool is therefore arranged on the apparatus, and embodied, for metal-cutting machining with an interrupted cutting engagement. This can be ensured, in the context of positioning of the apparatus or of the material-removing tool by means of the positioning arbor, by the fact that the tool rotation axis is different from the arbor axis, the tool rotation axis preferably being arranged parallel to the arbor axis and at a spacing therefrom. When the positioning arbor is introduced into the bit receptacle opening in such a way that the arbor axis and receptacle axis are collinear, the tool rotation axis is then, in the latter instance of an advantageous refinement of the present invention, arranged eccentrically with respect to the bit receptacle opening. In the event the positioning arbor is arranged with an offset with respect to the tool rotation axis, the arbor does not rotate together with the tool.

The tool rotation axis is different from the arbor axis when it is not collinear with it. Preferably the tool rotation axis is arranged parallel to the arbor axis and with a spacing therefrom, since it is then possible, with a particularly simple and slender design for the apparatus, to generate with the material-removing tool, quickly and with high positional accuracy, a flat end surface (front surface) that surrounds the bit introduction opening and is orthogonal to the receptacle axis of the bit receptacle opening and to the arbor axis of the positioning arbor introduced into the bit receptacle opening. Another result of a tool rotation axis that is generally different from the arbor axis is, however, that a different embodiment of that front surface can also be generated, for example a conical front surface.

The aforementioned displacement of the end surface along the receptacle axis is therefore accomplished as a rule by the fact that an originally present end surface, which is also referred to in the present application as a "front surface," is generated again, after it has been displaced or destroyed by wear, by metal-cutting machining of the bit-head-proximal end region at a location on the bit holder determined as a function of the identified wear state.

In order to ensure that the material-removing tool can machine in metal-cutting fashion the bit-head-proximal end region of the tool holder along its entire circumference in a context of interrupted cutting engagement, provision is advantageously made that the at least one material-removing tool is rotatable both around the tool rotation axis and around the arbor axis.

Provision is usually made in this context that the rotation speed of the material-removing tool around its tool rotation axis is orders of magnitude greater than a rotational motion of the material-removing tool around the arbor axis.

The material-removing tool can be a tool having a geometrically determinate cutting edge, for example a milling cutter rotating around the tool rotation axis, in the present case in particular an end mill, so that with it an end surface or front surface that is maximally flat and orthogonal to the receptacle axis can be generated at the bit-head-proximal longitudinal end of the bit holder. The material-removing tool can also be a tool having a geometrically indeterminate cutting edge, in which case a cutting tool having a bonded-grain abrasive is preferred because of the greater volume of material removed per unit time. The material-removing tool can be, for example, an end grinding tool.

In principle, the positioning arbor can be embodied in single-piece fashion.

Precisely in order to ensure, for manual operation of the apparatus, rotatability of the material-removing tool around the arbor axis when the torque around the arbor axis is low, however, it can be advantageous to embody the positioning arbor in multiple parts. The positioning arbor can then comprise at least one abutment component arrangement, located radially farther outward with reference to the arbor axis, which comprises the abutment segment that is embodied for abutment against the inner wall of the bit receptacle opening. An arbor core arrangement can be located radially farther inward. In this case the abutment component arrangement can be embodied from hardened material in order to make possible repeated introduction into and removal from a bit receptacle opening with as little wear as possible. The arbor core arrangement, conversely, does not need to be configured with the robustness of the abutment component arrangement. The arbor core arrangement can, however, be arranged movably relative to the abutment component arrangement, in principle axially with reference to the arbor axis with respect to the abutment component arrangement and/or in a circumferential direction around the arbor axis. Preferably the abutment component arrangement and the arbor core arrangement are rotatable relative to one another around the arbor axis, so that the abutment component arrangement can be stationary and securely in abutment against the inner wall of the bit receptacle opening, while the arbor core arrangement can be rotated around the arbor axis relative to the abutment component arrangement so as thereby also to rotate the material-removing tool around the arbor axis and thus to impart to it a feed motion in a circumferential direction around the arbor axis.

A rolling bearing or plain bearing can be embodied between the abutment component arrangement and the arbor core arrangement. The arbor core arrangement itself can also constitute a plain-bearing pairing with the abutment component arrangement, in which context the abutment component arrangement then, for the reasons recited above, preferably comprises the harder of the two arrangement materials.

For particularly exact guidance of the material-removing tool in particular around the arbor axis, the apparatus can preferably comprise a tool carrier. The material-removing tool is rotatable around the tool rotation axis relative to the tool carrier, the tool rotation axis preferably being defined nondisplaceably relative to the tool carrier. In this case the material-removing tool can be guided, together with the tool carrier, to perform a feed motion in particular in a circumferential direction around the arbor axis. The material-removing tool can be rotatably mounted directly in the tool carrier and/or can be coupled indirectly or directly, in torque-transferring fashion, to the output member of the rotary actuator. The rotary actuator can be fixedly and immovably coupled to the tool carrier.

In order to furnish an exact feed motion of the material-removing tool around the arbor axis, the tool carrier can be coupled to the positioning arbor so as to move together. When the positioning arbor is embodied in multiple parts as described above, the tool carrier is preferably coupled to the arbor core arrangement so as to move together, the tool carrier then also preferably being rotatable around the arbor axis relative to the abutment component arrangement so that while the positioning arbor is introduced into the bit receptacle opening, the abutment component arrangement of the positioning arbor can be coupled by frictional engagement to the bit holder or can be fastened in clamping fashion using a clamping device.

The tool rotation axis can be arranged collinearly with the actuator rotation axis, in particular when the output member of the rotary actuator is a clamping chuck. When the apparatus is intended to comprise several concurrently operable material-removing tools in order to furnish greater material-removing performance, it is advantageous if the at least one material-removing tool is arranged with a tool rotation axis differing from the actuator rotation axis. A torque-transferring transmission, which compensates for the difference in location and/or orientation of the two participating rotation axes, can then be provided between the output member of the rotary actuator and the material-removing tool. The arrangement of a torque-transferring transmission between the output member and the material-removing tool offers the possibility of providing a plurality of material-removing tools on the apparatus, each of the plurality of material-removing tools then being rotatable around a separate tool rotation axis. The tool rotation axes of the plurality of material-removing tools are preferably parallel, which simplifies the physical conformation of the transmission. For reliable rotary actuation of each material-removing tool, the transmission connects each material-removing tool of the plurality of material-removing tools to the output member in torque-transferring fashion.

An advantageously radially slender apparatus, i.e. an apparatus having the smallest possible dimensions orthogonally to the rotation axis, can be obtained, despite the use of a plurality of simultaneously actuatable material-removing tools, if the actuator rotation axis is oriented collinearly with the arbor axis. A slender apparatus is advantageous if the bit holder is to be overhauled by metal-cutting machining while arranged directly on the milling drum, since depending on the physical conformation of the milling drum, only a small space for placement of the apparatus may then be available at the ends of the individual bit holders.

The material-removing tools can be mounted, rotatably only around their respective tool rotation axis, in tool holders; the material-removing tools are then preferably arranged in a circumferential direction around a central gear or friction wheel of the transmission so that, by coupling the central gear or friction wheel of the transmission to the output member of the rotary actuator, all the material-removing tools can be actuated simultaneously to rotate around their respective tool rotation axis. It is advantageous in this case if the tool holder is rotatable around the actuator rotation axis relative to the rotary actuator, so that the individual material-removing tools can be moved in a feed direction around the actuator rotation axis with no need also to rotate the rotary actuator. Because the actuator rotation axis preferably coincides with the arbor axis in this case, the feed motion of the material-removing tools is in this case also a feed motion in a circumferential direction around the arbor axis, as described above.

In order to bring about a maximally uniform feed motion of the material-removing tools around the arbor axis and/or the actuator rotation axis, the transmission preferably encompasses or is a planetary gearset. In this case it is preferred if the output member of the rotary actuator is coupled in torque-transferring fashion to the sun gear, and if each material-removing tool of the plurality of material-removing tools is coupled in torque-transferring fashion to a respective planet gear of the planetary gearset. The tool carrier can then then constitute a ring gear of the planetary gearset, and is then preferably attached nonrotatably to the rotary actuator. In this case the tool rotation axes are defined not in stationary fashion on the tool carrier, but on the planet gear carrier.

As described above in detail, the actuator rotation axis very generally either can be arranged parallel to the tool rotation axis and at a spacing therefrom, or can be arranged collinearly with the tool rotation axis, the latter arrangement being preferred when only a single material-removing tool is provided. This is not intended, however, to exclude use of the planetary gearset even if only one material-removing tool is or can be arranged on the apparatus.

In order to ensure that metal-cutting machining by way of the apparatus takes place only to a prescribed extent, i.e. that the end surface on the tool holder machined by the apparatus assumes a predetermined position relative to the tool holder and thus relative to the milling drum axis, the apparatus can comprise, in simple and reliable fashion, a stop for limiting an advance motion of the material-removing tool occurring along the arbor axis. It makes sense here to embody a stop on the positioning arbor, since the latter engages into the bit receptacle opening of the bit holder and is thus located opposite a portion that is subject to little wear. In order to adjust the stop, the latter can be displaceable along the arbor axis, this being embodied e.g. by a stop screw that is threaded, collinearly or parallel to the arbor axis, into the end of the positioning arbor, in particular into the arbor core arrangement. A "stop screw" is thus considered to be any mechanical stop that is attached to the positioning arbor by a threaded shaft coupled thereto.

The positioning arbor having a displaceable stop can serve as an aforementioned gauge for identifying the wear state. For example, a worn bit holder can be machined using the apparatus described here, the stop being displaced on the apparatus, in particular on the positioning arbor, until the bit holder is sufficiently overhauled at its bit-head-proximal end surface. Using the setting of the stop thereby arrived at, the end surfaces of further bit holders, whose end surface position should be matched to that of the one first machined, are then machined as necessary.

The stop of the apparatus can interact with a segment of the bit holder, in particular of a quick-change bit holder, constituting a counter-stop, or can interact with a clamping apparatus clamping the bit holder or a sleeve-shaped segment of a quick-change bit holder, constituting a counter-stop.

With the apparatus described above it is possible principally to machine in metal-cutting fashion a defined end surface or front surface, enclosing the bit introduction orifice of the bit receptacle opening, of the bit-head-proximal end region of the bit holder. The possibility that the material-removing tool is a contour milling cutter or contour grinding tool, with which a bevel can be generated between the end face of the bit holder and the inner wall of the bit receptacle opening, should nevertheless not be excluded. The bevel serves as an aid to introduction of the bit shank into the bit receptacle opening from the bit introduction orifice.

The bevel between the end face of the bit holder and the inner wall of its bit receptacle opening can also be generated, however, in metal-cutting fashion by an apparatus in which the tool rotation axis is arranged collinearly with the arbor axis; the positioning arbor can be embodied integrally with the material-removing tool, so that it rotates around the tool rotation axis together with the material-removing tool. The positioning arbor is then preferably embodied with a smaller diameter than the bit receptacle opening into which it is introduced, so that the material-removing tool can in turn be operated with an interrupted cutting engagement in order to generate the bevel. Because it is possible only with difficulty in the circumstances described, specifically upon occurrence of the expected cutting forces on the material-removing tool in order to produce the above-described bevel, to ensure an unequivocal positional relationship between the material-removing tool and bit holder using only a positioning arbor whose diameter is smaller than that of the bit receptacle opening, the apparatus preferably comprises an alignment surface, orthogonal to the tool rotation axis, that is embodied for abutment against that end surface or front surface of the bit holder which encloses the bit introduction orifice of the bit receptacle opening. Preferably, therefore, firstly the end surface of the bit-head-proximal end region of the bit holder is machined in metal-cutting fashion with an apparatus, so that subsequently to being generated, said surface can serve as an abutment surface and reference surface for the alignment surface of the apparatus. The apparatus can then, using the alignment surface and positioning arbor, also be positioned again unequivocally relative to the tool holder during metal-cutting machining of the bevel on the tool holder. The positioning arbor then contacts the inner wall of the bit receptacle opening only along a linear contact surface that extends parallel to the arbor axis. When the positioning arbor is embodied integrally with the material-removing tool, it is in sliding abutment against the inner wall during metal-cutting machining.

In addition to the apparatus described and refined above, the present application relates to an overhauling assemblage encompassing an apparatus for metal-cutting machining of bit-head-proximal end regions of bit holders, as described and refined above, and further encompassing at least one bit holder, in particular a quick-change bit holder, of a road milling machine, having a bit receptacle opening extending along a receptacle axis into, preferably through, the bit holder. The at least one bit holder preferably has a sleeve-shaped or tubular segment that, in the state prepared for milling operation as intended, completely surrounds a shank of a bit. For effective and rapid overhauling, the bit holder is preferably attached to a milling drum base element, so that the overhauling assemblage preferably encompasses a plurality of bit holders that are attached to one common milling drum base element. Because overhauling advantageously occurs directly at a construction site at which a road milling machine carrying the milling drum that requires overhauling is being used, the overhauling assemblage also preferably encompasses a road milling machine having a milling drum mounted thereon, having a milling drum base element and a plurality of bit holders attached to the milling drum base element. The above-described apparatus for metal-cutting machining of bit-head-proximal end regions of bit holders is always a constituent of the overhauling assemblage.

The arbor axis of the apparatus of the overhauling assemblage can be collinear with the receptacle axis of the bit receptacle opening when the positioning arbor is introduced thereinto. This is advantageous in particular when the apparatus for metal-cutting machining of a bit-head-proximal end face of the bit holder is provided; the possibility that the bevel between an end surface of the bit holder and the inner wall of its bit receptacle opening can also be produced with the aforesaid apparatus is not to be excluded. This is the case in particular when the diameter of the material-removing tool is comparatively small, smaller than the diameter of the bit receptacle opening; and when the spacing between the arbor axis and tool rotation axis is small, smaller than the radius of the bit receptacle opening.

Alternatively, the arbor axis can be arranged parallel to the receptacle axis, at a spacing from the latter, when the positioning arbor is introduced into the bit receptacle opening. What can principally be achieved with this configuration is machining of the bevel between the end face and inner wall of the bit receptacle opening, the material-removing tool then preferably being a milling cutter, in particular a contour milling cutter, so that a bevel having axially different bevel angles can be generated, if possible, in one working step.

The present application furthermore relates to a use of an apparatus as described, embodied, and refined above, for overhauling a wear-affected bit-head-proximal end region of a bit holder, in particular a quick-change bit holder, of a road milling machine, having a bit receptacle opening extending along a receptacle axis into, preferably through, the bit holder.

The use of the apparatus can serve to generate an end surface that encloses a bit introduction orifice of the bit receptacle opening and has a predetermined end surface shape, in particular a flat end surface shape. The use can likewise serve to generate a bevel, having a predetermined bevel shape, between an end face enclosing a bit introduction orifice of the bit receptacle opening and an inner wall of the bit receptacle opening.

BRIEF DESCRIPTION OF THE DRAWINGS

The present invention will be explained in further detail below with reference to the appended drawings, in which.

DETAILED DESCRIPTION

Figure 1:
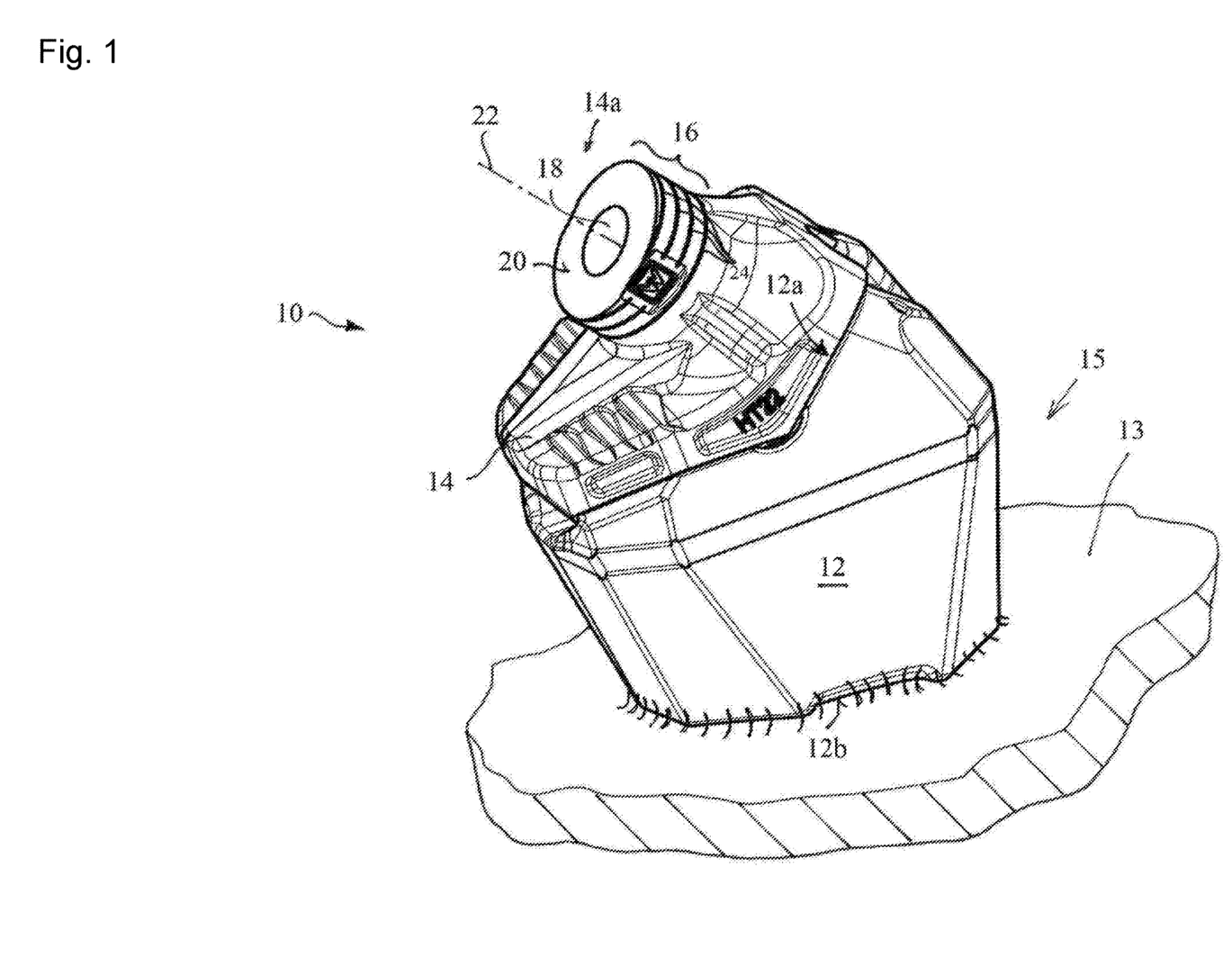
FIG. 1 is a perspective view of a quick-change bit holder, irregularly worn around the bit receptacle opening, in a support member of a quick-change bit holder system.

FIG. 1 is a perspective view in which a quick-change bit holder system of the "HT22" type, of the Applicant, is labeled overall as 10. This system encompasses as a base part a support member 12 that is embodied on one side 12*a* for reception of a quick-change bit holder 14, and is embodied on its side 12*b* located oppositely from quick-change bit holder 14 for intermaterial attachment to a very schematically depicted cylindrical milling drum base member 13. Support member 12 is therefore usually welded onto milling drum base member 13, and permits quick-change bit holders 14 to be exchanged.

Quick-change bit holder 14 has a sleeve-shaped segment 16 in which is embodied a bit receptacle opening 18 that, in the example depicted, is embodied cylindrically and preferably passes completely through quick-change bit holder 14, and in which, in a context of preparation as intended for milling operation, a bit shank of a round-shank bit known per se (not depicted in the Figures) is received.

Bit receptacle opening 18 is surrounded, at the bit-head-proximal end 14*a* of quick-change bit holder 14, by an end face or front face 20 extending completely around bit receptacle opening 18.

End surface 20 is usually located oppositely from a wear disk (not depicted in the Figures) that is arranged between the bit head and front surface 20 of quick-change bit holder 14.

In the present example, end surface 20 of quick-change bit holder 14 is generated by wear, namely by granular material that is produced as roadway pavements are milled off and end up between the bit head or wear disk and end surface 20. As a result of the large operating forces acting on the milling bit and thus also on quick-change bit holder 14 during milling operation, and because of the rotatability of the milling bit and/or the wear disk, relative to quick-change bit holder 14, around the shank axis that coincides with receptacle axis 22, the (in part) mineral and/or ceramic granular constituents of the removed material which penetrate between the bit head and/or wear disk on the one hand and end surface 20 of quick-change bit holder 14 on the other hand have a highly abrasive effect both on the wear disk and on that segment 16 of quick-change bit holder 14 which faces toward end surface 20. The wear disk is sacrificed during milling operation in order to protect the bit head. The unavoidable wear on the bit-head-proximal end of quick-change bit holder 14 must at first be accepted.

In order to quantify the wear on the quick-change bit holder from its original front surface 20 along receptacle axis 22, wear marks 24 are provided, for example as circumferential groove depressions, in sleeve-shaped segment 16 at a predetermined interval of, for example, 5 mm, on the basis of which marks the wear on a quick-change bit holder 14 can be quantitatively evaluated.

Because wear marks 24 are each placed in planes oriented orthogonally to receptacle axis 22, the uneven wear on end surface 20, or on the bit-head-proximal end 14a of quick-change bit holder 14, is detectable.

Figure 2:
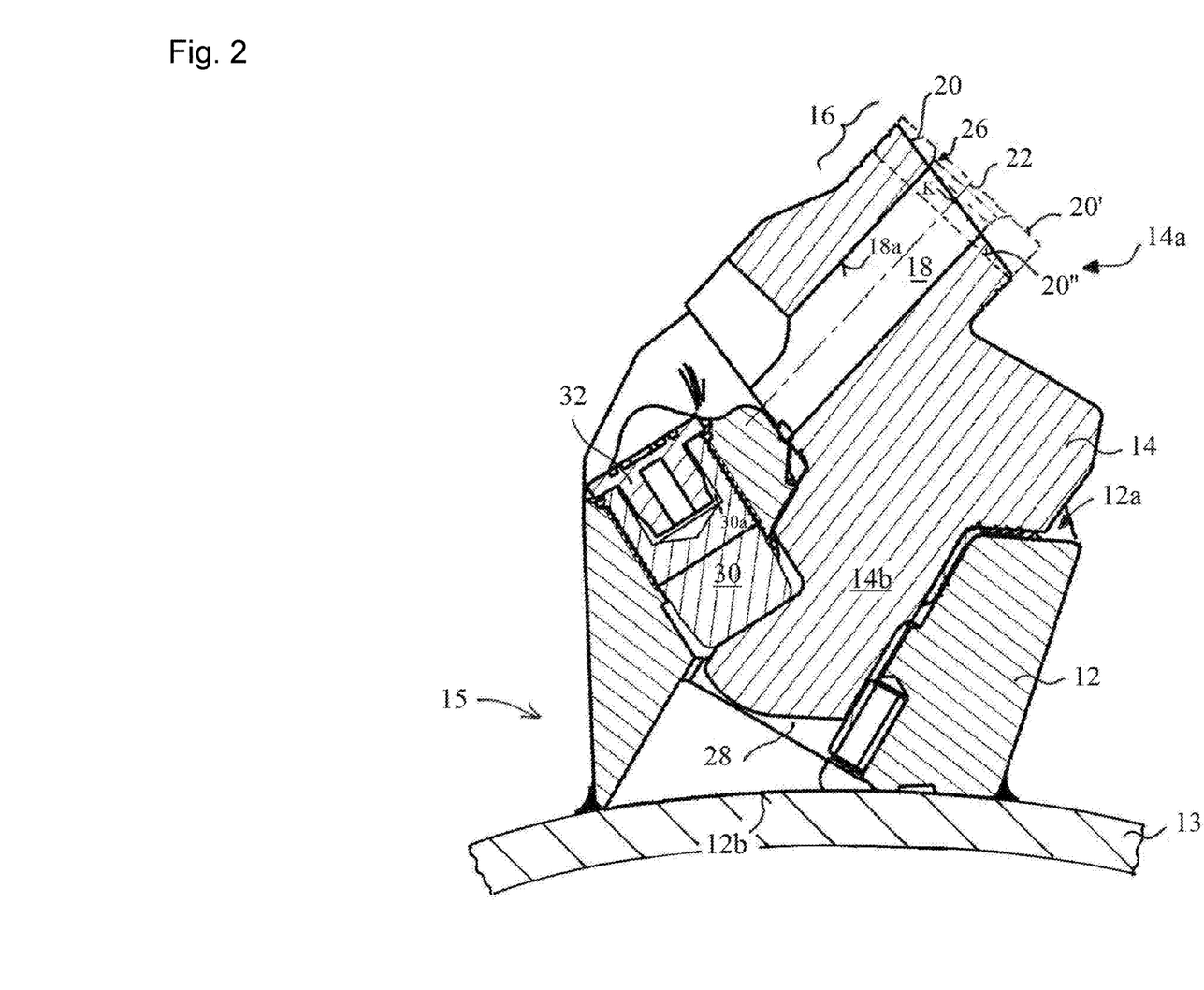
FIG. 2 is a longitudinal section view through the worn quick-change bit holder of FIG. 1, attached to a milling drum base element.

FIG. 2 depicts quick-change bit holder system 10 known per se, with milling drum base element 13 that carries it, in longitudinal section in order to explain the physical construction in particular of quick-change bit holder 14. Milling drum base element 13 and a plurality of quick-change bit holder systems 10 constitute a milling drum 15, known per se, of a road milling machine.

The original unworn shape of the bit-head-proximal longitudinal end 14a of quick-change bit holder 14, and thus of sleeve-shaped segment 16, is depicted with dashed lines.

With quick-change bit holder 14 in the brand-new state, a bevel 26 is embodied between the original end surface 20', i.e. the one existing before quick-change bit holder 14 is used for the first time, and an inner wall 18a of bit receptacle opening 18, as an introduction aid for introducing a bit shank into bit receptacle opening 18 along receptacle axis 22. Bevel 26 can comprise two axially successive segments having different bevel angles.

Quick-change bit holder 14 comprises a bit holder shank 14b that is introduced into a shank receptacle opening 28 of support member 12 and is positively secured there in a manner known per se by means of a securing set screw 30, to prevent it from being pulled out of shank receptacle opening 28. Tool engagement portion 30a of securing set screw 30 is protected by a plug 32 from penetration of dirt during milling operation, so as to ensure tool engagement against securing set screw 30 even after milling operation, and thus ensure that quick-change bit holder 14 can be detached from support member 12.

As a result of wear on bit-head-proximal end 14a of quick-change bit holder 14 during milling operation, the original end surface 20' has been displaced along receptacle axis 22 to end surface 20 that now exists. In addition, end surface 20 has been tilted, as compared with the originally provided unworn end surface 20', around a tilt axis K that is orthogonal to receptacle axis 22 and to the drawing plane of FIG. 2.

The worn quick-change bit holder 14 shown in longitudinal section in FIG. 2 does not necessarily need to be replaced with a new quick-change bit holder 14, but instead can be overhauled for further milling operation by metal-cutting machining of its bit-head-proximal end region 14a. For this, in the example depicted, end surface 20 must be taken back again to a flat location orthogonal to receptacle axis 22, as depicted approximately by the overhauled front surface 20" depicted with dashed lines in FIG. 2. After metal-cutting machining of end region 14a, front surface 20" is embodied in a manner that is flat and orthogonal to receptacle axis 22.

The apparatuses proposed below serve for the above-described requisite overhauling of quick-change bit holder 14.

As a result of the unavoidable shortening of sleeve-shaped region 16 due to metal-cutting machining, a round-shank bit inserted into the overhauled quick-change bit holder 14 has a cutting circle radius that is shortened, by an amount approximately equal to the spacing between end surfaces 20' and 20", as compared with the use thereof in a brand-new quick-change bit holder 14 of the same type.

The possibility therefore exists, in principle, of examining worn quick-change bit holders 14 in terms of their wear state and, if applicable, classifying them in terms of their amount of wear and/or in terms of their cutting circle radius or cutting circle diameter after overhauling, and equipping a milling drum with overhauled quick-change bit holders 14 of the same classification class. The milling drum thereby obtained would have a smaller cutting circle diameter than a milling drum of identical design equipped with brand-new quick-change bit holders 14, but because of the classification that was previously performed, the decreased cutting circle diameter is uniform over the milling drum. The milling drum that has been overhauled in this fashion can be used like a milling drum equipped in brand-new fashion, taking into consideration its decreased cutting circle diameter. The decreased cutting circle diameter must be taken into account when setting the milling depth.

Figure 3:
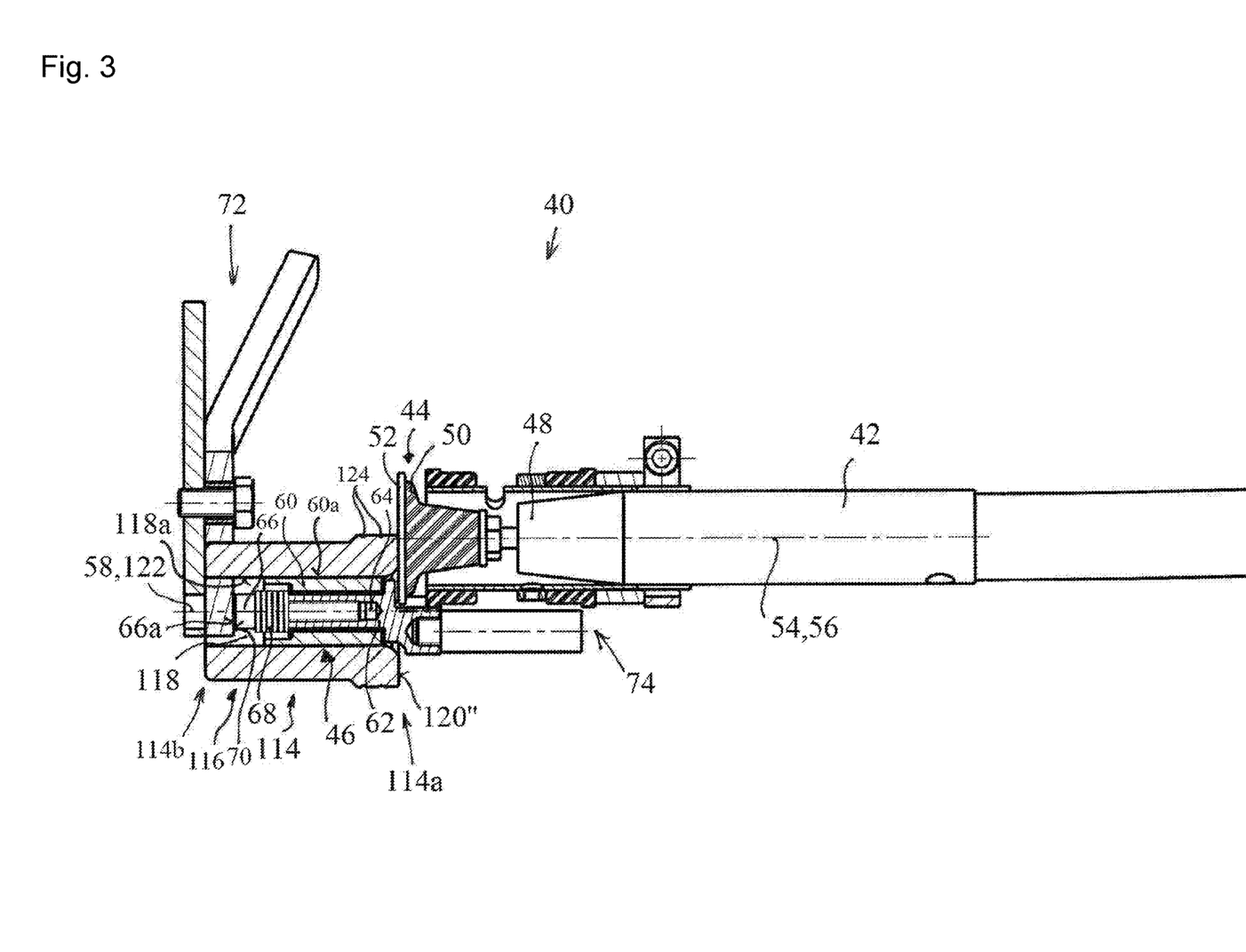
FIG. 3 shows a first embodiment according to the present invention of an apparatus for metal-cutting machining of a bit-head-proximal end surface of a bit holder.

FIG. 3 is a partial longitudinal section through a first embodiment of an apparatus according to the present invention for metal-cutting machining of the bit-head-proximal end region of a bit holder, specifically as an overhauling assemblage together with the bit holder that is to be overhauled.

The bit holder depicted in FIG. 3 is not a quick-change bit holder 14 as depicted in FIGS. 1 and 2, but rather a variant embodiment of a bit holder whose identical and functionally identical component segments are labeled with the same reference characters as in FIGS. 1 and 2 using the example of the quick-change bit holder, but incremented by 100.

Bit holder 114 of FIG. 3 is constituted exclusively by a tubular segment 116, and is welded at its outer surface into a correspondingly shaped recess on the milling drum base element. Bit holder 114 is therefore, as intended, attached nondetachably to the milling drum base element and must be separated from it using welding technology.

FIG. 3 shows bit holder 114 having an almost finally machined end surface 120".

This machining is accomplished using an apparatus 40 that comprises a rotary actuator 42, a material-removing tool 44, and a positioning arbor 46. Material-removing tool 44 is located between rotary actuator 42, or its output member 48 in the form of a clamping chuck, and positioning arbor 46.

Material-removing tool 44 is a surface grinding tool and comprises a grinding disk carrier 50 having a grinding disk 52 provided thereon. Output member 48 of rotary actuator 42 is rotatable around an actuator rotation axis 54 that is collinear with tool rotation axis 56 around which the surface-grinding material-removing tool 44 is rotatable in the state (shown in FIG. 3) coupled to rotary actuator 42, in order to generate material-detaching cutting forces at grinding disk 52.

Positioning arbor 46 extends along an arbor axis 58 that, in the state shown in FIG. 3 in which positioning arbor 46 is introduced into bit receptacle opening 118, is collinear with receptacle axis 122.

Positioning arbor 46 comprises a sleeve-shaped abutment component arrangement 60 on whose outer side 60a is embodied an abutment segment that abuts in planar fashion against inner wall 118a of bit receptacle opening 118. Abutment segment 60a proceeds continuously around arbor axis 58 and extends in an axial direction, with reference to arbor axis 58, by an amount that is greater than the value of the diameter of positioning arbor 46, preferably greater than twice the diameter.

Located radially inside abutment component arrangement 60 is an arbor core arrangement 62 that is rotatable around arbor axis 58 relative to abutment component arrangement 60. The rotatability of arbor core arrangement 62 around arbor axis 58 relative to abutment component arrangement 60 is the only relative degree of freedom of movement of arbor core arrangement 62 relative to abutment component arrangement 60. Positioning arbor 46 can also, however, be rotatable as a whole around receptacle axis 122 relative to bit holder 114.

A screw 66 is threaded into a central recess 64 of arbor core arrangement 62, a plurality of washers 68 being arranged between the screw head of screw 66 and arbor core arrangement 62 so that a front-side end surface 66a of screw 66 can be used as a mechanical stop of positioning arbor 46. Screw 66 acts as a stop together with a counter-stop surface 70 of a clamping apparatus 72 that is embodied to clamp bit holder 114 at its bit-head-distal longitudinal end region 114b.

That component of clamping apparatus 72 which carries counter-stop surface 70 is also introduced into bit receptacle opening 118 like positioning arbor 46, but each from different ends of bit holder 114. In a departure from what is depicted, bit holder 114 can be arranged on a milling drum base element during overhauling by means of apparatus 40. Clamping apparatus 72 can also be introduced into a bit holder 114 welded onto a milling drum base element in order to furnish a counter-stop.

An axial advance motion of apparatus 40 along arbor axis 58 is adjustable by way of screw 66 and stop surface 66a embodied on its end face.

Rotary actuator 42, together with its output member 48 (clamping chuck) and material-removing tool 44 coupled thereto, is attached via a tool carrier 74 to arbor core arrangement 62 of positioning arbor 46.

In the embodiment shown in FIG. 3, the configuration of apparatus 40 is such that tool rotation axis 56 is arranged parallel to arbor axis 58 but with an offset therefrom. This enables machining of end surface 120 or 120" using a geometrically indeterminate cutting edge and bonded-grain abrasives, with interrupted cutting.

A feed motion in a circumferential direction around arbor axis 58 can be generated manually by a rotation of arbor core arrangement 62, together with tool carrier 74 and thus rotary actuator 42 and material-removing tool 44, around arbor axis 58 relative to abutment component arrangement 60. End surface 120 or 120" can thereby be machined along its entire circumference around the arbor axis. Because abutment segment 60a is axially long and proceeds around arbor axis 58 continuously in a circumferential direction, arbor axis 58 is unequivocally and securely determined in terms of its collinear location with reference to receptacle axis 172 when positioning arbor 46 is introduced into receptacle opening 118. The location of actuator rotation axis 54, and with it the location of tool rotation axis 56, is unequivocally determined by tool carrier 74. Rotary actuator 42 is attached immovably relative to tool carrier 74 by being clamped to it.

Using stop surface 66a, a plurality of similar tool holders 114 can thus be machined in metal-cutting fashion to a uniform longitudinal dimension, and thus overhauled after being worn as discussed above.

As a result of the above-described axial location of apparatus 40 of FIG. 3, apparatus 40 as a whole is slender, i.e. its extent is substantially greater along the prolonged notional arbor axis 58 than orthogonally thereto.

Figure 4:
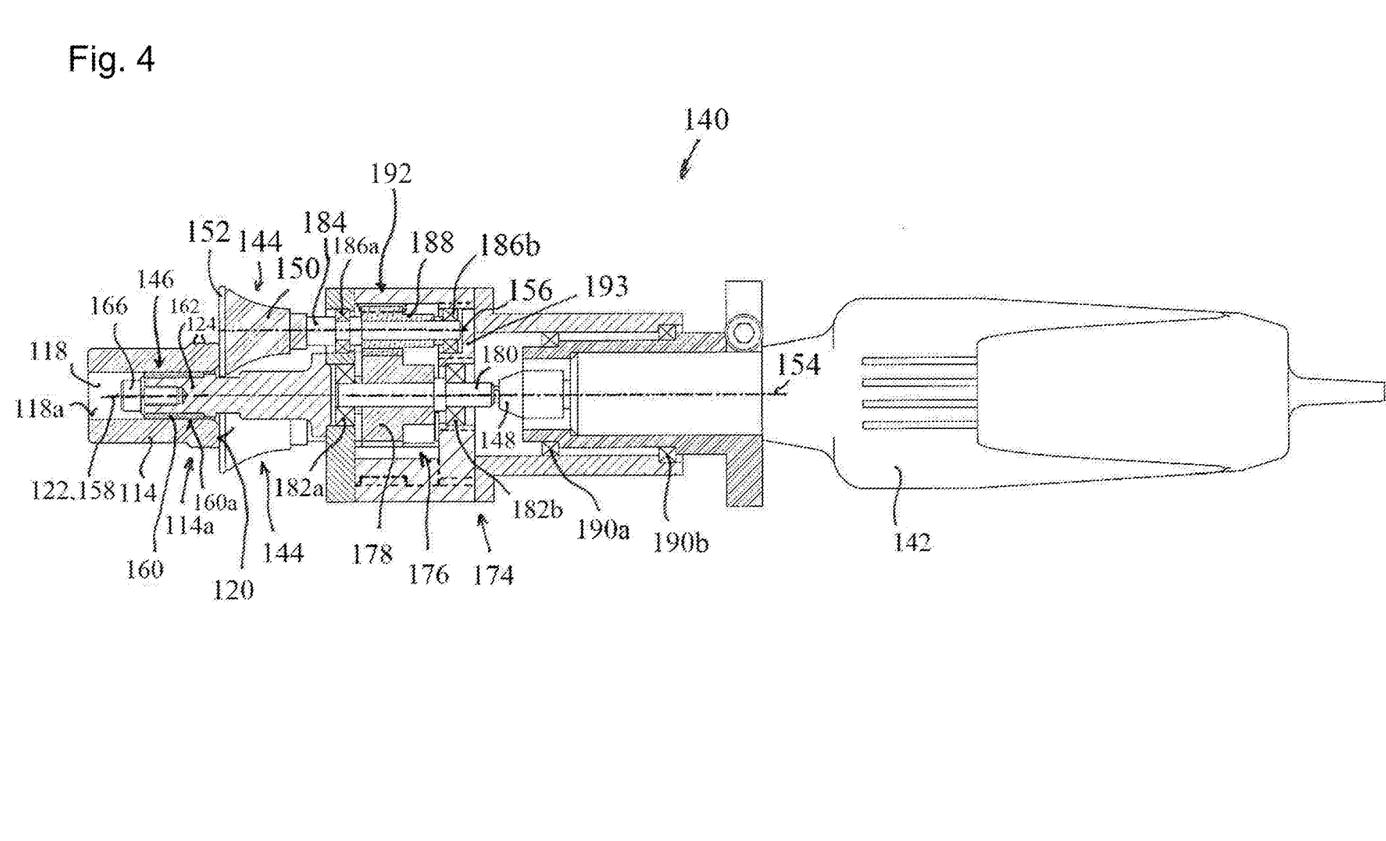
FIG. 4 is a longitudinal section view through a second embodiment of an apparatus for metal-cutting machining of a bit-head-proximal end surface of a bit holder.

FIG. 4 shows a second embodiment according to the present invention of an apparatus 140 for metal-cutting machining of wear-affected bit-head-proximal end regions 114a of bit holders 114 of road milling machines.

Identical and functionally identical components and component segments are labeled with reference characters identical to those on apparatus 40 of FIG. 3, but incremented by 100. Tool holder 114 of FIG. 4 corresponds to that of FIG. 3 and will not be explained further. For a description thereof, the reader is expressly referred to the description provided in FIG. 3 of bit holder 114. The clamping situation of bit holder 114 is the same as in FIG. 3, but in the interest of clarity it is not depicted in FIG. 4.

The embodiment of apparatus 140 of FIG. 4 will be described below only insofar as it differs from the embodiment of FIG. 3, to the description of which the reader is otherwise expressly referred for an explanation of apparatus 140 of FIG. 4 as well.

A first difference between the first and the second embodiment of the respective apparatuses 40 and 140 is that apparatus 140 comprises a plurality of, specifically exactly three in the example depicted, material-removing tools 144. Material-removing tools 144, with their respective tool rotation axes 156, are arranged in angularly equidistant fashion around arbor axis 158. Tool rotation axes 156 are each parallel to arbor axis 158 and are each at the same spacing therefrom. The angular spacing between two tool rotation axes 156 that are directly adjacent around arbor axis 158 is consequently equal to 120°.

In a departure from the first embodiment of apparatus 40 of FIG. 3, tool rotation axes 156 are also arranged parallel to, but at a spacing from, actuator rotation axis 154 of rotary actuator 142.

For torque transfer between rotary actuator 142 and the plurality of material-removing tools 144, a transmission 176 is arranged in the torque path between rotary actuator 142 and material-removing tools 144.

Transmission 176 encompasses a central gear 178 that is attached to a gear shaft 180, for example by being shrunk on or by way of a spline shaft attachment, so as to rotate together, the rotation axis of gear shaft 180 of central gear 178 being oriented collinearly with actuator rotation axis 154. Gear shaft 180 has an engagement portion that is coupled to clamping chuck 148, constituting the output member of rotary actuator 142, so as to rotate together. Gear shaft 180 is rotatably mounted in tool carrier 174 via two rolling bearings 182a and 182b.

Each material-removing tool 144 is coupled, so as to rotate together, to a tool shaft 184 that is mounted, rotatably around the respective tool rotation axis 156, in tool carrier 174 via rolling bearings 186a and 186b.

A respective tool gear 188 that meshes with central gear 178 is attached to each tool shaft 184, for example by being shrunk on or by splining, so as to rotate together. Each material-removing tool 144 is of identical configuration in terms of mounting and rotary actuation. Each material-removing tool 144 can thus be driven by rotary actuator 142, with the same torque and at the same rotational speed, to rotate around the respective tool rotation axis 156. This in turn enables uniform machining of end surface 120 of tool holder 114 with interrupted cutting using a geometrically indeterminate cutting edge and bonded-grain abrasive. Because a plurality of material-removing tools 144 are provided, however, the material volume removable by apparatus 140 per unit time is greater than that of apparatus 40 of FIG. 3.

Tool carrier 174 can be mounted rotatably relative to rotary actuator 142 around the rotation axis of gear shaft 180 which is collinear with actuator rotation axis 154, for example by way of rolling bearings 190*a* and 190*b*. A feed motion of material-removing tools 144 in a circumferential direction around arbor axis 158 can thus be produced by manually rotating tool carrier 174 relative to rotary actuator 142.

Alternatively thereto, tool carrier 174 can also be coupled nonrotatably to rotary actuator 142, and a segment 192 of tool carrier 174 which surrounds gears 178 and 188 can be embodied as a ring gear that likewise meshes with tool gears 188.

In this case transmission 176 is a planetary gearset in which central gear 178 is the sun gear, in which tool gears 188 are the planet gears, and in which segment 192 constitutes the actuator-mounted ring gear. Planet gears 188 must of course be mounted on a planet gear carrier 193 that is rotatable around central axis 154,158 of the planetary gearset relative to sun gear 178 and relative to the ring gear.

When the above-described planetary gearset is used, what is brought about with rotary actuator 142 by rotationally actuating sun gear 178 is not only the rotation of material-removing tools 144 around their tool rotation axes 156, but also a rotary motion of planet gear carrier 192, and thus a feed motion of the respective material-removing tools 144, around arbor axis 158.

Positioning arbor 146 is in turn fixedly attached to tool carrier 174, which can be embodied in multiple parts in order to make it easier to manufacture and assemble.

Figure 5:
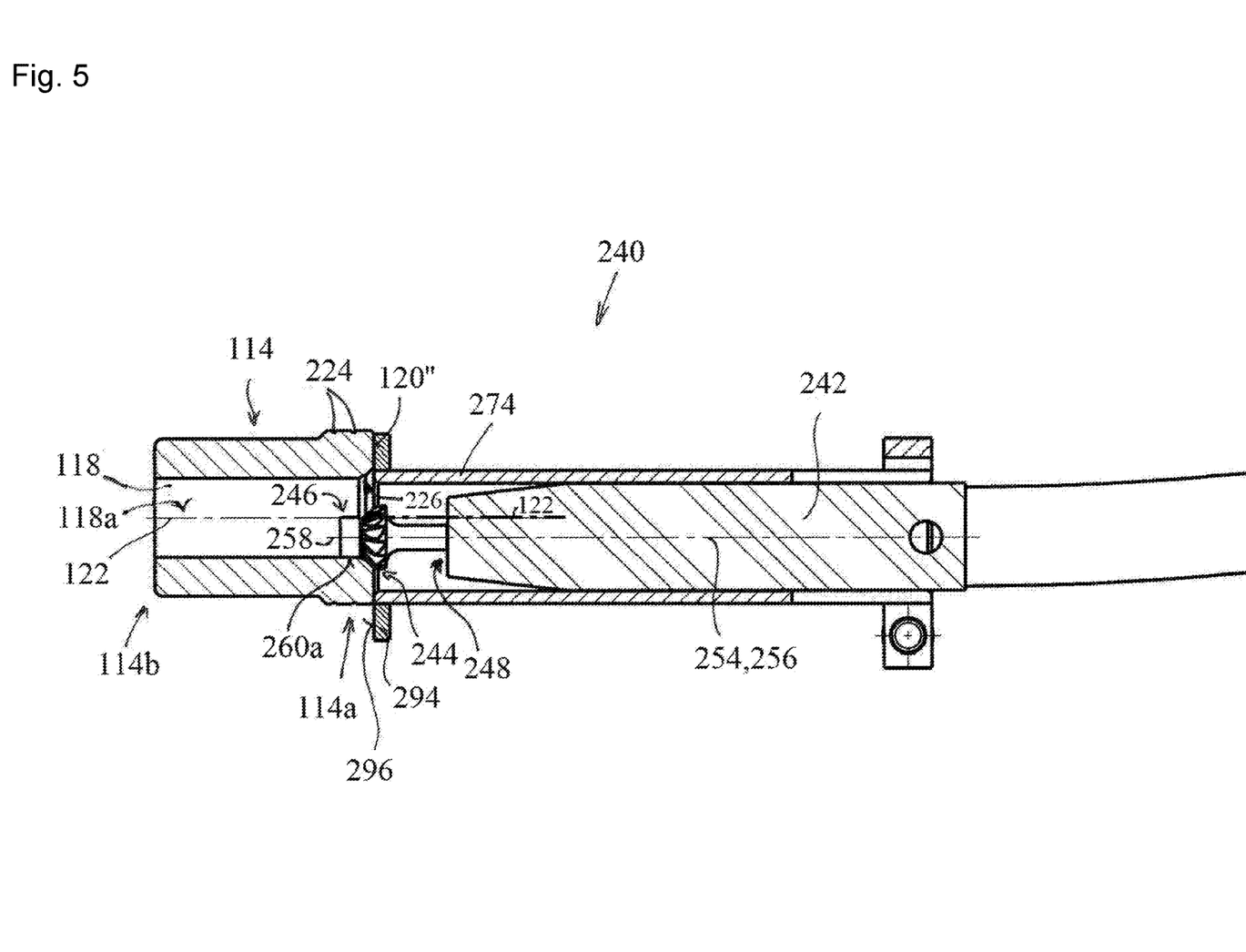
FIG. 5 shows an apparatus for metal-cutting machining of a bevel between an end surface and an inner wall of the bit receptacle opening of a bit holder.

FIG. 5 depicts a further embodiment 240 of an apparatus according to the present invention for metal-cutting machining of wear-affected bit-head-proximal end regions 114*a* of bit holders 114 of road milling machines.

Components and component segments that are identical and functionally identical to those in FIGS. 3 and 4 are labeled on apparatus 240 with identical reference characters, but incremented respectively by 100 and 200.

Tool holder 114 of FIG. 5 is identical to tool holders 114 of FIGS. 3 and 4.

The embodiment of FIG. 5 will be explained below only insofar as it differs from the preceding embodiments, to the description of which the reader is otherwise expressly referred for an explanation of the embodiment of FIG. 5 as well.

Apparatus 240 in FIG. 5 serves to manufacture bevel 226 by means of a material-removing tool 244 in the form of a profile milling cutter.

Bevel 226 is manufactured after the desired end surface 120" is provided, so that the latter can serve as a further reference surface and abutment surface for metal-cutting manufacture of bevel 226.

Positioning arbor 246 in the present case is on the one hand embodied integrally with material-removing tool 244, and stands out from the cutting edge region on that side of the cutting edge region of material-removing tool 244 which faces away from rotary actuator 242.

Positioning arbor 246 has a diameter smaller than the diameter of bit receptacle opening 118 (approximately half its size), and therefore abuts against inner wall 118*a* of bit receptacle opening 118 only linearly along an abutment segment 260*a* parallel to the arbor axis. Because positioning arbor 246 is embodied integrally with material-removing tool 244, it rotates around tool rotation axis 256 together with the material-removing tool.

Positioning arbor 246 is therefore in sliding abutment engagement with inner wall 118*a* in abutment segment 260*a*.

In addition, the axial length of positioning arbor 246 along arbor axis 258 is shorter than its diameter orthogonally to arbor axis 258. Using positioning arbor 246, the location of arbor axis 258 relative to abutment segment 260*a*, but not its angular orientation relative to receptacle axis 122 of tool receptacle opening 118, can therefore be defined with sufficient accuracy for milling machining.

In order to compensate for this shortcoming in terms of definition, apparatus 240 comprises a rotary-actuator-mounted alignment disk 294 having an alignment surface 296 that, in axial terms with reference to tool rotation axis 256, actuator rotation axis 254, or arbor axis 258, faces away from rotary actuator 242 and toward bit holder 114. In the example depicted, alignment surface 296 is flat and oriented orthogonally to rotation axes 254 and 286 and to arbor axis 258, so that it can be abutted in planar fashion against the finally machined end surface 120". The angular orientation of tool rotation axis 256 relative to receptacle axis 122 can be accurately adjusted thanks to the abutment of alignment surface 296 against the finally machined end surface 120", so that alignment surface 296, together with the axially short positioning arbor 246, ensures an unequivocal location for material-removing tool 144 with reference to tool receptacle opening 118 and its receptacle 122.

Apparatus 240 is an apparatus that is to be moved manually, i.e. material-removing tool 244 is moved around receptacle axis 122, maintaining the abutment relationship of alignment surface 296 with the finally machined end surface 120", until bevel 226 is finally machined.

In apparatus 240, tool rotation axis 256 and actuator rotation axis 254 are collinear. Arbor axis 258 is also collinear with them. With correct abutment on the one hand of alignment surface 296 against finally machined end surface 120", and on the other hand of positioning arbor 246 against inner wall 118*a* of receptacle opening 118, axes 254, 256, and 258 are arranged parallel to the receptacle axis but with an offset from it. This as well enables cutting engagement with interrupted cutting, which is advantageous because the cutting edges involved are not overheated.

With regard to the overhauling assemblages of FIGS. 3, 4, and 5, i.e. the respective apparatus 40, 140, and 240 together with bit holder 114 that is to be machined using the apparatus, it is the case for each of these embodiments that in the state ready for machining, at least tool rotation axis 56, 156, 256 is always arranged parallel to receptacle axis 122 of tool holder 114, but with an offset from it.

The invention claimed is:

1. An apparatus for metal-cutting machining of wear-affected bit-head-proximal end regions of bit holders of a road milling machine, comprising:
   a rotary actuator including an output member rotatable around an actuator rotation axis;
   at least one material-removing tool rotatable around a tool rotation axis, the at least one material-removing tool being configured to be coupled to the output member so that the at least one material-removing tool and the output member are rotatable together;
   a positioning arbor extending along an arbor axis, the positioning arbor being configured to be introduced into a bit receptacle opening of at least one of the bit holders, the positioning arbor including an abutment segment located radially remotely from the arbor axis and facing away from the arbor axis in a direction having a radial component, the abutment segment including an abutment surface configured for abutment against an inner wall of the bit receptacle opening, the abutment surface including all surface area of the positioning arbor that abuts against the inner wall, and the abutment surface extending continuously completely around the arbor axis;

wherein the at least one material-removing tool includes a material removing region;

wherein the tool rotation axis is configured to be always parallel to and spaced laterally from the arbor axis during a material-removing operation so that the at least one material-removing tool is arranged to generate by the material-removing operation a flat end surface extending normal to the arbor axis on an uppermost end of the at least one of the bits holders with respect to said arbor axis and surrounding a bit introduction orifice of the bit receptacle opening of the at least one of the bit holders when the positioning arbor is received in the bit receptacle opening; and wherein during machining of the flat end surface, the entirety of the at least one material-removing tool is arranged between the output member and the entirety of the abutment surface of the positioning arbor in a direction that extends parallel to the tool rotation axis.

2. The apparatus of claim 1, wherein:
the at least one material-removing tool is rotatable both around the tool rotation axis and around the arbor axis.

3. The apparatus of claim 1, wherein:
the positioning arbor includes an arbor core located radially inward from the abutment segment, the arbor core and the abutment segment being rotatable relative to one another around the arbor axis, the abutment segment extending continuously completely around the arbor core.

4. The apparatus of claim 1, further comprising:
a tool carrier, the at least one material-removing tool being connected to the tool carrier and rotatable relative to the tool carrier about the tool rotation axis, the tool rotation axis being nondisplaceable relative to the tool carrier.

5. The apparatus of claim 4, wherein:
the tool carrier is coupled to the positioning arbor so that the tool carrier and at least a portion of the positioning arbor move together.

6. The apparatus of claim 4, wherein:
the positioning arbor includes an arbor core located radially inward from the abutment segment, the arbor core being rotatable relative to the abutment segment around the arbor axis; and
the tool carrier is coupled to the arbor core so that the tool carrier and the arbor core are rotatable together around the arbor axis relative to the abutment segment.

7. The apparatus of claim 1, wherein:
the tool rotation axis is offset from the actuator rotation axis; and the apparatus further includes a torque-transferring transmission between the output member and the at least one material-removing tool.

8. The apparatus of claim 7, wherein:
the at least one material-removing tool includes a plurality of material-removing tools, each material-removing tool being rotatable around a respective tool rotation axis; and
the transmission provides torque-transferring connection of each material-removing tool to the output member.

9. The apparatus of claim 8, wherein:
the transmission includes a planetary gearset including a sun gear and a plurality of planet gears, the output member being coupled to the sun gear and each of the plurality of material-removing tools being coupled to a respective planet gear.

10. The apparatus of claim 1, wherein:
the actuator rotation axis is arranged parallel to the tool rotation axis and laterally spaced therefrom.

11. The apparatus of claim 1, wherein:
the actuator rotation axis is arranged collinearly to the tool rotation axis.

12. The apparatus of claim 1, wherein:
the positioning arbor includes a stop defined on a longitudinal end of the positioning arbor located farthest away from the at least one material-removing tool, the stop being configured to limit, advancement of the positioning arbor along the arbor axis into the bit receptacle opening.

13. The apparatus of claim 1, in combination with the at least one of the bit holders, wherein:
the at least one of the bit holders is a quick-change bit holder of the road milling machine, the at least one of the bit holders including the bit receptacle opening extending along a receptacle axis into the at least one of the bit holders.

14. The apparatus of claim 13, wherein:
the arbor axis is arranged collinearly with the receptacle axis when the positioning arbor is introduced into the bit receptacle opening.

15. The apparatus of claim 1, wherein:
the abutment segment extends along the arbor axis over a distance longer than a diameter of the inner wall of the bit receptacle opening when the abutment surface is engaged with the inner wall of the bit receptacle opening.

16. The apparatus of claim 1, wherein:
the abutment segment extends along the arbor axis over a distance at least twice a diameter of the inner wall of the bit receptacle opening when the abutment surface is engaged with the inner wall of the bit receptacle opening.

17. An apparatus for metal-cutting machining of wear-affected bit-head-proximal end regions of bit holders of a road milling machine, comprising:
a rotary actuator including an output member rotatable around an actuator rotation axis;
at least one material-removing tool rotatable around a tool rotation axis, the at least one material-removing tool being configured to be coupled to the output member so that the at least one material-removing tool and the output member are rotatable together;
a positioning arbor extending along an arbor axis, the positioning arbor being configured to be introduced into a bit receptacle opening of at least one of the bit holders, the positioning arbor including an abutment segment located radially remotely from the arbor axis and facing away from the arbor axis in a direction having a radial component, the abutment segment being configured for abutment against an inner wall of the bit receptacle opening over a distance along the arbor axis longer than a diameter of the inner wall of the bit receptacle opening;
wherein the at least one material-removing tool includes a material removing region arranged between the positioning arbor and the output member; and
wherein the tool rotation axis is configured to be always parallel to and spaced laterally from the arbor axis so that the at least one material-removing tool is arranged to machine a flat end surface extending normal to the arbor axis and surrounding a bit introduction orifice of the bit receptacle opening of the at least one of the bit holders when the positioning arbor is received in the bit receptacle opening.

18. The apparatus of claim 17, wherein:
the abutment segment is configured for abutment against the inner wall of the bit receptacle opening over a distance along the arbor axis at least twice the diameter of the inner wall of the bit receptacle opening.

19. The apparatus of claim 18, wherein:
the abutment segment is configured for abutment against the inner wall of the bit receptacle continuously completely around the arbor axis.

* * * * *